Nov. 30, 1948. M. J. OBERT 2,455,136
METHOD OF SECURING LEADS TO ELECTRICAL CAPACITORS
Filed Dec. 31, 1943
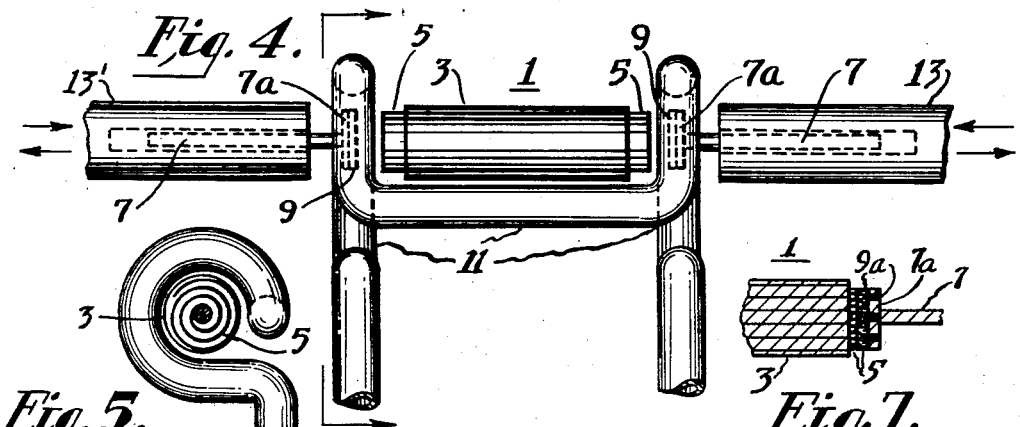
Inventor
MAXIMILIAN J. OBERT
By
C. S. Nuska
Attorney Patented Nov. 30, 1948

2,455,136

UNITED STATES PATENT OFFICE 2,455,136

METHOD OF SECURING LEADS TO ELECTRICAL CAPACITORS

Maximilian J. Obert, North Merchantville, N. J., assignor to Radio Corporation of America, a corporation of Delaware Application December 31, 1943, Serial No. 516,396

5 Claims. (Cl. 219—12)

This invention relates to fixed capacitors of the type comprising a plurality of foil armatures inter-rolled or interleaved with suitable strips or layers of insulating material (e. g. paper) and has special reference to improvements in the art of affixing the terminal connectors or leads to such multi-layer structures.

The prior art dictates the use of either aluminum foil or tin foil as the armature material for fixed capacitors of the general (i. e. "fixed") type described. Aluminum foil is to be preferred to tin foil because (a) it exhibits a longer electrical life when exposed to the usual capacitor impregnating materials, (b) it is stronger than a tin foil of the same thickness and (c) it is cheaper, lighter in weight and, unlike tin, is at present available in quantities suitable for mass production.

While as above indicated, aluminum foil possesses several advantages over tin foil, foil of the latter type is more commonly employed in the manufacture of fixed capacitors because aluminum can not be soldered (at least by conventional methods), and difficulties therefore arise in attaching the electrical leads to the rolled or stacked armature.

Accordingly, an object of the present invention is to provide an improved method of forming an electrically conductive connection between an aluminum foil capacitor armature, or similar structure, and the metal terminal or leads therefor.

Another and important object of the invention is to provide a reliable yet rapid method of attaching the leads to an oil or wax impregnated capacitor, and one which is applicable to both solderable and non-solderable metals without the use of solder-flux.

A related object is to provide an improved rugged and trouble-free impregnated fixed capacitor, and one which lends itself readily to mass production methods.

Certain preferred details of construction, together with other objects and advantages, will be apparent and the invention itself will be best understood upon reference to the following specification and to the accompanying drawing, wherein:

Figures 1 and 2 are views in perspective of two of numerous forms of electrical leads which may be employed in carrying the invention into effect, Figure 3 is a side elevational view showing a lead provided, in accordance with the invention, with a disc of solder on its connecting face, Figure 4 is an elevational view partly in section of an apparatus employed for attaching a pair of leads to a capacitor-roll in accordance with the invention, Figure 5 is an end view taken on the line 5—5 of Figure 4, but with the lead removed to reveal the rolled foil armature which projects from the end of the capacitor, Figure 6 is a view similar to Figure 4, but showing the leads and jigs of the said Figure 5 at the final stage in the attaching operation, Figure 7 is a longitudinal sectional view of the projecting foil end of the capacitor roll with a lead permanently affixed thereto in accordance with the invention, and Figure 8 is an elevational view of an encased but otherwise finished capacitor within the invention.

In the accompanying drawing, wherein like reference characters designate the same or corresponding parts throughout, there is shown a roll-capacitor, indicated generally at 1, comprising a plurality of suitable paper strips 3, which are wound on a mandrel or arbor (not shown) with a plurality of strips of aluminum, tin or other suitable metal foil 5 therebetween. The foil strips 5 comprise the electrode elements or armatures of the capacitor; they are spaced edgewise and the marginal edge portions thereof extend beyond the marginal edges of the paper strips or body of the roll to provide exposed foil armature ends to which conductive leads 7 are attached in a manner later described.

As shown more clearly in Figures 1 and 2, the connectors or leads to be permanently attached to the projecting foil ends of the armatures 5 may be in the form of wire-like conductors 7 terminating adjacent one end in an apertured flange which may comprise either an end portion of the wire, wound in the form of a spiral in a plane normal to the axis of the wire as shown at 7a (Fig. 1), or a perforated circular end plate 7b (Fig. 2) fixed to the end of the wire 7. In either event the flanged end 7a or 7b of the lead 7 is provided, in accordance with the invention, with a serving of solder which may be in the form of a disc 9 of the same diameter as the flanged end to which it is secured. The disc 9 may be attached to the flanged end 7a or 7b of the lead 7 by causing the solder to harden within the apertures 7c or 7d with which the said flange is provided.

In attaching the leads 7 to the projecting ends of the rolled metal foil 5, in accordance with the method of the invention, the solder 9 on the end of the said leads 7 is first heated to a temperature such that it is rendered fluid or molten and yet is retained on the connector-end or flange 7a or 7b by surface tension. The fluid or semi-fluid solder on the flanged ends of the leads is then brought against the ends of the rolled foil 5 and this releases or relieves the molecular forces (i. e. surface tension) which normally hold the fluid solder on the leads and cause the solder to flow into the space between the adjacent faces of the projecting end portions of the rolled foil armatures 5. The flanged ends 7a or 7b of the leads or connectors 7 are then pushed against the ends of the rolled foils 5 with sufficient force to embed said flanged connector-ends and to collapse and compact said foil in the fluid solder. The solder is then permitted to cool about the compacted foil and, as shown in Figure 7, forms a solid embedment 9a in which the foil 5 and flanged ends 7a or 7b of the leads are securely and permanently locked.

The method of the present invention lends itself readily to the mass production of fixed capacitors both of the rolled type and of the stack type. One convenient form of apparatus which may be used in carrying the method of the invention into effect is shown in Figures 4 and 5 wherein 11 designates a radio frequency applicator for heating the solder-bearing flanges 7a, 7b on the connectors 7, and 13 and 13' designate a pair of laterally movable insulating chucks for holding the said connectors during the attaching operation. The radio frequency applicator 11 here illustrated comprises a continuous length of hollow copper tubing (through which a cooling fluid, not shown, is adapted to be circulated) bent in the outline of an open-ended cylinder within which the capacitor 1 is placed with its foil ends 5 adjacent to the open ends of the cylinder in a position to receive the flanged connectors 7a, 7b when the latter are moved inwardly on the chucks 13 and 13' respectively.

In one successful application of the invention to a capacitor roll of standard dimensions the current applied to the applicator 11 was of the order of five kilowatts at a frequency of about seven-hundred kilocycles. In this case the solder comprised a mixture of 65% tin and 35% zinc and was brought to the previously described fluid or semi-fluid condition on the connectors at a temperature of about 375°–400° C. in a fraction of a second. Thus the movement of the solder-bearing connectors 5 through the open ends of the applicator 11 was substantially continuous.

During the brief period that intervenes between the heating of the solder and the application of the compression force to the projecting ends of the foils 5, the solder bearing flanged portions 7a and 7b of the connector 7 are in heat exchange relation with the said foil ends. Thus, should the said foil ends be coated with one of the usual capacitor impregnants (e. g. wax or oil) the coating material will be rendered fluid by the transferred heat and flow off the said projecting surfaces of the foil, whereby perfect electrical continuity between the said surfaces and the solder embedment is ensured.

From the foregoing it is apparent that the present invention provides a reliable yet rapid method of attaching leads to multi-layer capacitor armatures and similar structures, and one which lends itself readily to the manufacture of capacitors employing either non-solderable or solderable foil like parts.

What is claimed is:

1. The method of attaching an electrical connector to each end of a fixed capacitor of the type having a multi-layer foil armature projecting from each end thereof, including the steps of placing a metallic disc of low temperature melting metallic substance between each end of the condenser foils and each connector, placing said condenser and connectors within a coil having radio frequency currents flowing therethrough, heating said metallic substance to a fluid state by the application of said radio frequency heating currents, flooding the space between the layers of said projecting portion of said armature foils with said metallic substance in the fluid state, placing an end of each one of said connectors against the end of said projecting portion each one of said armatures with sufficient force to collapse said foils and to embed said connector ends with said low temperature metallic substance, and then permitting said metallic substance to harden about the ends of said collapsed foils and said embedded connector ends.

2. The method of attaching electrical connectors, of the type having an apertured flange, to each end of a capacitor of the type having a body portion and a projecting metallic armature portion formed of a plurality of layers of aluminum metal foil, said method comprising providing the end of each connector with a serving of solder, placing a connector in a position adjacent each one of the ends of said capacitor, heating said serving of solder until it is in a molten state and retained by surface tension to said apertured flange portion of each one of the connectors, moving each connector toward the projecting metallic armature portions of said condenser to relieve the surface tension holding the molten solder and causing it to flow into the spaces of the adjacent layers of the projecting aluminum metallic foil end portions, pushing the flanged conductor ends into the projecting aluminum metallic foil layers with sufficient force to collapse and compact said aluminum metallic foil layers into the molten solder, and permitting the molten solder to cool.

3. The method of attaching electrical connectors, of the type having a flanged portion, to each end of a fixed capacitor having a multi-layer foil armature projecting from each end thereof, said method comprising providing an end of each one of said connectors with a serving of solder in a solid state, placing said fixed capacitor and connectors within a coil adapted for carrying radio frequency currents, heating said solder by the application of radio frequency current to said radio frequency coil, to a temperature such that said serving of solder is rendered fluid and yet is retained on said connector ends by surface tension, bringing said flanged end of each one of said connectors against the projecting ends of said foils to release the surface tension retaining said fluid solder, and causing it to flow into the spaces between adjacent faces of said foil armatures, pressing the ends of said connectors against the ends of said foil armatures with sufficient force to embed said connector ends and to collapse said foil armature ends in said fluid solder, and then permitting the solder to harden.

4. The method of attaching electrical connectors of the type having flanged ends to each end of an impregnated fixed capacitor having a multi-layer foil armature projecting from each end thereof, said method comprising providing an end of one of said connectors with a serving of solder, placing said fixed capacitor and connectors within a radio frequency coil, heating said solder by the application of radio frequency current to said radio frequency coil to a temperature such that the serving of solder is rendered fluid and yet is retained on said connectors by surface tension, bringing said heated end of each one of said connectors into heat exchange relation with said foil ends, whereby the capacitor impregnant thereon is caused to flow away from the projecting portions of said armature, forcing each one of the ends of said connectors against the impregnant-free portions of said foils to release the surface tension retained by said solder and to cause said solder to flow into the space between the layers of said foil armatures, pressing said flanged ends of said connectors against the ends of said projecting portions of said foil to embed said connectors and to compact said foil ends in said fluid solder, and then permitting said solder to harden.

5. The method of attaching an electrical connector to each end of a fixed capacitor of the type having a multilayer foil armature projecting from each end thereof, said method comprising the placing of said condenser and said connectors within a radio frequency coil having a turn portion located adjacent each end of the condenser, heating a disc of low temperature melting metallic substance to a semi-fluid state by subjecting the disc to radio frequency heating currents which flow through the coils located at the ends of said condenser and then forcing the connectors against the semi-fluid metallic substance in the direction of the foil armatures and maintaining the connectors in their forced position to thereby embed an end of each one of the connectors and the end of the projecting portion of the foil armatures in said fluid metallic substance and then permitting said semi-fluid metallic substance to harden.

MAXIMILIAN J. OBERT.

REFERENCES CITED

The following references are of record in the file of this patent:

UNITED STATES PATENTS

| Number | Name | Date |
| --- | --- | --- |
| 1,948,506 | Caine | Feb. 27, 1934 |
| 1,952,925 | Kopinski | Mar. 27, 1934 |
| 2,011,555 | Burlingame | Aug. 13, 1935 |
| 2,057,790 | Potter | Oct. 20, 1936 |
| 2,257,643 | Paschke | Sept. 30, 1941 |
| 2,273,609 | Wrighton et al | Feb. 17, 1942 |
| 2,292,117 | Grimshaw | Aug. 4, 1942 |
| 2,306,291 | Alons | Dec. 22, 1942 |
| 2,397,052 | Schietinger | Mar. 19, 1946 |
| 2,419,484 | Danziger | Apr. 22, 1947 |

FOREIGN PATENTS

| Number | Country | Date |
| --- | --- | --- |
| 543,279 | Great Britain | Feb. 17, 1942 |
| 661,607 | Germany | June 22, 1938 |
| 61,433 | Norway | Sept. 25, 1939 |